Feb. 7, 1967    M. J. MORRISETTE    3,303,307
ELECTRICALLY OPERATED VISUAL INDICATOR AND FUSE FOR FUEL
TANK PROTECTION SYSTEMS AND THE LIKE
Filed April 5, 1966
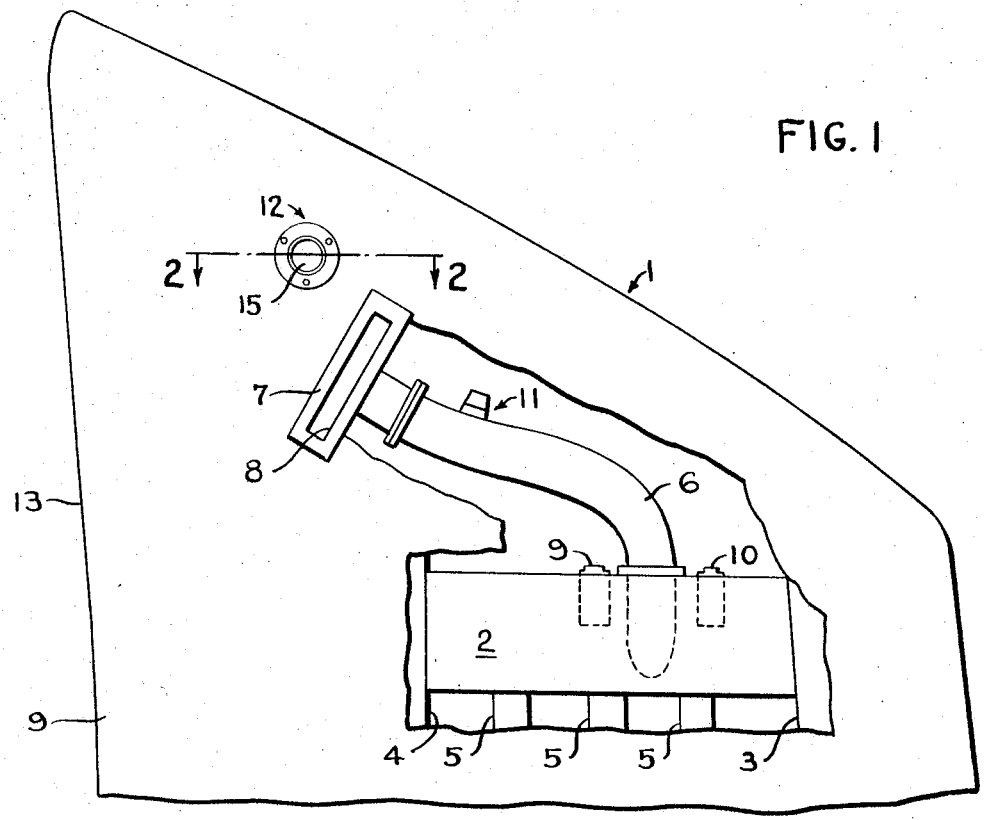
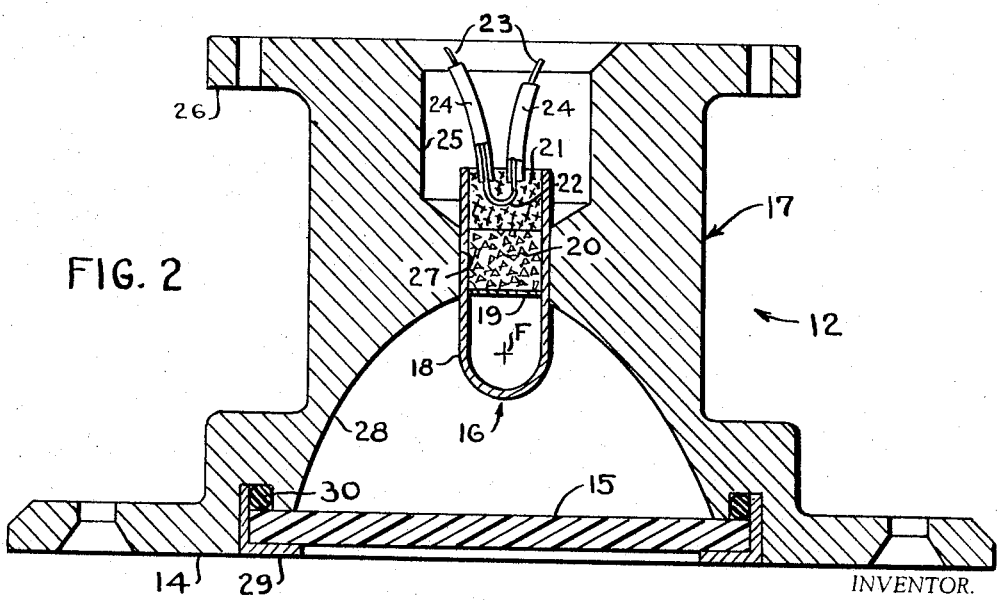
INVENTOR.
MILTON J. MORRISETTE
BY
Kenway, Jenney & Hildreth
ATTORNEYS

United States Patent Office 3,303,307
Patented Feb. 7, 1967

3,303,307
ELECTRICALLY OPERATED VISUAL INDICATOR AND FUSE FOR FUEL TANK PROTECTION SYSTEMS AND THE LIKE
Milton J. Morrisette, Ashland, Mass., assignor to Fenwal, Incorporated, Ashland, Mass., a corporation of Massachusetts
Filed Apr. 5, 1966, Ser. No. 540,284
2 Claims. (Cl. 200—121)

My invention relates to visual indication, and particularly to a novel electrically-operated visual indicator and fuse for fuel tank protection systems and the like.

Explosion suppression systems have been developed for preventing the explosive pressures that might develop in an enclosed or partially enclosed space containing a combustible mixture of gases should the gases be ignited. Such systems rely upon the detection of radiation from a flame front formed as a combustible mixture is ignited, and bursting a container loaded with inerting fluid to expel a charge of inerting gases into the space to be protected, thereby extinguishing the flame before an explosive rise in pressure can occur. Once such an explosion suppressor has been actuated, it may be some time before an explosive mixture can again be formed in the protected space. Eventually, however, particularly in a vented space such as the vapor space in a fuel tank, the inerting gases will be dispelled and a combustible mixture will again be formed somewhere between the liquid surface and the exterior atmosphere.

The probability of an explosion may be greatly reduced by taking precautions against sparks, flames, and other sources of ignition, but in some instances cannot be eliminated by such precautions alone. For example, in an aircraft wing fuel storage system comprising a plurality of tanks vented to the atmosphere through a surge tank leading to a vent conduit, the combustible mixture will normally be formed in the vent conduit as the aircraft loses altitude, or just outside of it as altitude is gained. A lightning stroke that would otherwise be harmless may ignite such a mixture, causing a flame front to be propagated down the vent conduit into the tanks at a rate causing an explosive pressure rise, and consequent loss of the aircraft. Such an explosion can be effectively prevented by one or more explosion suppressors operated as described. However, since the explosion suppressor or suppressors would be located in the tank walls inside the skin of the aircraft, there will be no direct indication that a suppressor had been actuated.

An explosion suppressor is normally electrically actuated, as by a blasting cap. Thus, one could conceivably provide an indicator in the cockpit wired to the suppressor that would give an indication of its operation. However, it is highly undesirable to carry the wiring for protection systems long distances, as would be necessary in the case of the large aircraft currently in use. For that reason, it is desirable to mount an indicator near the components of the protection system, as adjacent the vent port near the wing tip on the lower surface of the wing. Such an indicator can be observed by ground personnel standing beside the aircraft. As the wing tip may be ten feet or more above the ground, it is desirable to have a relatively large and highly visible indicator. It is one object of my invention to increase the size and visibility of electrically operated indicators for this purpose.

It would be a simple matter to provide a large bright indication by supplying power to a lamp, such as those used as landing beacons. On the other hand, carrying electrical current to power such an indicator would also require long runs of wire to the power supply, and would involve an independent circuit that could fail even though the suppressor circuit had operated, or operate when the suppressor circuit had failed. In addition, such an independent circuit would add the risk that it might be the source of an ignition spark. Additional objects of my invention are to eliminate the need for a continuous supply of energy to an indicator, and to permit the operation of an indicator by the current supplied to actuate an explosion suppressor.

Briefly, an electrically operated indicator in accordance with my invention comprises a parabolic reflector, adapted to be mounted on the exterior surface of an aircraft or other visible location, and having in the region of its focal point an electrically operated indicating capsule. The indicating capsule preferably comprises a transparent bulb projecting into the reflector, and a opaquely covered container of fluorescent colored powder in the capsule behind the bulb portion. A charge of explosives is mounted behind the colored powder in the capsule, and a pair of terminals are connected to a bridge wire imbedded in the charge, in the manner of an electrical blasting cap, to ignite it when a current is passed through the terminals. The bridge wire is broken by the passage of current actuating the indicator and thus the device also functions as a fuse. When the charge is detonated, the inside of the bulb is coated with colored powder, causing the cover disk to appear as a bright-colored disk rather than as a white or mirror-like disk. The terminals of the indicator are wired in series with the bridge wires of the explosion suppressors in the aircraft fuel protection system, and thereby will operate when and only when actuating current is passed through the suppressors. By this arrangement, a permanent indication is given of the actuation of the fuel protection system that can be observed from a considerable distance and safety is increased by interruption of the actuating circuit across the indicator terminals.

The construction of the indicator of my invention, and its mode of operation, will best be understood in the light of the following detailed description, together with the accompanying drawings, of a preferred embodiment thereof.

In the drawings, FIGURE 1 comprises a schematic sketch in plan of the lower portion of the wing tip of an aircraft in which the indicator of my invention is installed, with parts broken away; and FIGURE 2 comprises a schematic cross sectional view of the indicator of FIGURE 1, taken substantially along the lines 2—2 in FIGURE 1.

In FIGURE 1, I have shown the bottom surface of the left wing tip 1 of an aircraft in which a surge tank 2 is mounted, in any conventional manner; not shown, between a front spar 3 and a rear spar 4. The tank 2 communicates in a known manner with other tanks located in the wing by means of vent conduits such as 5. Vapor separated from any liquid that may fall in the surge tank is vented to the atmosphere through a curved vent conduit 6, terminating in vent flange 7 having an opening 8 faired into the aircraft's skin 9.

The aircraft is assumed to be provided with a fuel tank protection system, such as that described and claimed in copending application Serial No. 540,301, filed on the same day as this application by Charles F. Rockwell for Control and Indication System for Explosion Suppressors, and assigned to the assignee of my application. Generally, such a system comprises one or more explosion suppressors such as 9 and 10, of the conventional electrically actuated type, mounted in the wall of the surge tank 4. The detectors are actuated when a flame front signifying an incipient explosion is propagated in the conduit 6 and irradiates a detector 11 comprising a photocell, not shown. The photocell responds to the radiation from a flame front to cause the detector circuit to actuate the suppressors 9 and 10.

Mounted in the lower surface of the wing is an indicator 12, to be described. The indicator is preferably located about a quarter of the chord forward of the trailing edge 13. The indicator comprises a mounting flange 14, for securing the indicating apparatus to the wing structure, and a transparent cover plate 15. As will be described, the cover plate presents either a bright colored appearance or white appearance accordingly as the suppressors 9 and 10 have or have not been operated, respectively.

Referring to FIGURE 2, the indicator 12 comprises a conventional electrically-actuated indicating capsule generally designated as 16 positioned in a housing 17 of any desired non-magnetic material. The indicating capsule 16 may be of the conventional construction comprising a transparent capsule 18 of clear glass, plastic, or the like, and having a hollow portion extending above an opaque layer 19 of white paint, white paper, or the like, dividing the hollow bulb portion from a slug 20 of bright colored powder such as fluorescent yellow orange pigment or the like. Below the slug of pigment 20 is a charge of explosive 21, such as lead styphnate or the like, in which is buried a detonating bridge wire 22 which will fuse and ignite the charge 21 when current is supplied to input terminals 23. As is conventional, the terminals 23 are brought out through insulators such as 24. The terminals 23 may be connected to any conventional circuit connector, and for this purpose an opening 25 is provided in the housing 17 and shaped to receive the selected connector. The terminals 23 may be wired in series with the corresponding terminals of the suppressors 9 and 10, not shown, in the firing circuit of the detector 11.

A base flange 26 is formed at one end of the housing 17, adapted to be connected to the mounting flange of the selected connector. In practice, the opening 25 and the flange 26 will be shaped to conform to the particular connector selected.

A reduced axial passage 27 is formed in the housing 17 to receive the capsule 16. Beyond the passage 27 the housing 17 is shaped to form a parabolic reflector having an inner surface 28 that is silvered, polished or otherwise made highly reflective. The bulb 18 of the capsule 16 encloses the focal point F of the reflector. The outer portion of the housing 17 is formed integrally with the flange 14. The cover plate 15, of glass, clear plastic or the like, is secured to the flange 14 by conventional means, here shown as a retaining ring 29 held in place by a resilient O-ring 30.

In operation, when current is supplied to the terminals 23, the charge 21 will be detonated to cast the powder 20 into contact with the inner walls of the bulb 18, causing the bulb 18 to assume a bright color. The particles 20 of pigment are caused to be adherent to the walls of the bulb portion 18 in a conventional manner, as by very lightly greasing the inside of the bulb 18. Before the indicator is actuated, the cover plate 15 will appear as a white disk. When the powder has been applied to the inside of the bulb 18, the cover plate 15 will be seen as a bright colored disk. It will thus be evident that the protection system has been put into operation even from a considerable distance away.

While I have described the indicator of my invention with respect to the details of a preferred embodiment thereof, changes and variations will be apparent to those skilled in the art upon reading my description, and such can obviously be made without departing from the scope of my invention.

Having thus described my invention, what I claim is:

1. An indicator, comprising a parabolic reflector, having an optical axis along which the focal point of the reflector is located, a transparent hollow capsule extending from a base portion into said reflector along said axis in a region enclosing said focal point, a slug of colored powder adherent to the inside of said capsule and enclosed in said base portion, an opaque coating over said slug on the side adjacent said reflector, a charge of explosives in said capsule adjacent to the side of said slug away from said reflector, a current-interrupted bridge wire passing through said charge and having terminals extending out of said capsule to respond to current applied to said terminals to detonate said charge and thereby propel said powder into adherent contact with the inside of said capsule to produce a colored coating thereon, and a transparent cover plate over said reflector, whereby said cover plate appears as a plain or a colored disk according as actuating current has or has not been supplied to said terminals.

2. A current pulse triggered indicator for producing a bright, visible and relatively large indication of the operation of an aircraft explosion suppressor, comprising a flange adapted for mounting on an aircraft wing flush with the outer surface thereof, a parabolic reflector connected to said flange and concentric therewith for reflecting radiation, originating adjacent a focal point along the optical axis of said reflector, normal to said surface and outwardly therefrom, an indicating capsule located on said axis and comprising a hollow portion projecting outwardly into said reflector and enclosing the focal point of the reflector, a slug of colored flourescent pigment in said coating on said slug on the side adjacent said reflector, a charge of explosive on an opposite side of said slug to propel said powder into contact with the inside of said capsule upon detonation of said charge, a bridge wire passing through said charge and terminating in a pair of terminals outside of said capsule, said wire being adapted to be connected in series with the actuating circuit of an explosion suppressor and detonating said charge in response to the passage of sufficient current to actuate said suppressor, and a transparent cover plate mounted over said reflector and secured to said flange adjacent the outer surface thereof when mounted on an aircraft, whereby upon the application to said terminals of current sufficient to actuate a suppressor the cover plate appears as a bright colored disk.

References Cited by the Examiner

UNITED STATES PATENTS

| | | | |
|---|---|---|---|
| 1,857,019 | 5/1932 | Hassell et al. | 200—121 |
| 3,005,102 | 10/1961 | MacHutchin et al. | 250—77 |

BERNARD A. GILHEANY, *Primary Examiner.*

H. B. GILSON, *Assistant Examiner.*